US011858758B2

(12) United States Patent
Rapparini et al.

(10) Patent No.: US 11,858,758 B2
(45) Date of Patent: Jan. 2, 2024

(54) MACHINE AND METHOD FOR ARRANGING OBJECTS IN AN ALTERNATE MANNER ALONG SINGLE FILE ROWS

(71) Applicant: Aroma System s.r.l., Bologna (IT)

(72) Inventors: Gino Rapparini, Bologna (IT); Maurizio Generali, Bologna (IT)

(73) Assignee: AROMA SYSTEM S.R.L., Bologna (IT)

( * ) Notice: Subject to any disclaimer, the term of this patent is extended or adjusted under 35 U.S.C. 154(b) by 0 days.

(21) Appl. No.: 17/516,379

(22) Filed: Nov. 1, 2021

(65) Prior Publication Data

US 2022/0135349 A1   May 5, 2022

(30) Foreign Application Priority Data

Nov. 4, 2020 (IT) .................. 102020000026347

(51) Int. Cl.
*B65G 57/081* (2006.01)
*B65B 35/50* (2006.01)
(Continued)

(52) U.S. Cl.
CPC ............ *B65G 57/081* (2013.01); *B65B 35/50* (2013.01); *B65G 47/32* (2013.01); *B65G 47/682* (2013.01);
(Continued)

(58) Field of Classification Search
CPC .... B65G 57/081; B65G 47/32; B65G 47/682; B65G 47/846; B65G 57/03;
(Continued)

(56) References Cited

U.S. PATENT DOCUMENTS 4,067,433 A * 1/1978 Phipps ................. B65G 47/084
198/374
7,137,234 B2 * 11/2006 Caporali ................. B07C 3/008
53/433
(Continued)

FOREIGN PATENT DOCUMENTS

CN    108327988    7/2018
EP    3002224    4/2016
(Continued)

OTHER PUBLICATIONS

Search Report from corresponding Italian Application No. 102020000026347 dated Jul. 21, 2021; 18 pages.

*Primary Examiner* — Lynn E Schwenning
(74) *Attorney, Agent, or Firm* — Fattibene and Fattibene, LLC; Paul A. Fattibene

(57) ABSTRACT

A machine and method for arranging objects comprising a first end with a protruding edge and a second end, on the opposite side of the protruding edge, in an alternate manner along single file rows. A guide guides objects in a single file row to a separator for receiving and separating the objects into a first and a second group and for alternately feeding the first and the second group to a collector and dropping device configured for rotating the objects of the first group and the second group according to a predetermined orientation and for stacking the objects one above the other in an alternate manner along single file rows.

22 Claims, 10 Drawing Sheets

(51) Int. Cl.
  *B65G 47/32* (2006.01)
  *B65G 47/68* (2006.01)
  *B65G 47/84* (2006.01)
  *B65G 57/03* (2006.01)

(52) U.S. Cl.
  CPC .......... *B65G 47/846* (2013.01); *B65G 57/03* (2013.01); *B65G 2201/0235* (2013.01)

(58) Field of Classification Search
  CPC . B65G 2201/0235; B65B 35/50; B65B 35/54; B65B 29/022; B65B 5/101; B65B 35/12; B65B 35/205; B65B 35/32; B65B 35/44; B65B 35/56; B65B 39/005; B65B 39/007; B65B 35/30
  See application file for complete search history.

(56) References Cited

U.S. PATENT DOCUMENTS

| | | | |
|---|---|---|---|
| 10,040,587 B2 * | 8/2018 | Rapparini | B65B 29/022 |
| 2016/0096642 A1 * | 4/2016 | Rapparini | B65B 29/022 |
| | | | 198/397.06 |
| 2017/0036865 A1 * | 2/2017 | Sassi | B65G 47/846 |
| 2018/0265304 A1 | 9/2018 | Rapparini | B65G 47/252 |

FOREIGN PATENT DOCUMENTS

| | | |
|---|---|---|
| EP | 3375719 | 9/2018 |
| WO | WO 2018203208 | 11/2018 |

* cited by examiner

MACHINE AND METHOD FOR ARRANGING OBJECTS IN AN ALTERNATE MANNER ALONG SINGLE FILE ROWS

FIELD OF TECHNOLOGY

The present invention relates to the field of machines for arranging objects in single file rows, for subsequent packaging of the same. More particularly, the present invention refers to the field of machines for arranging objects comprising a first end and a protruding edge placed near the first end, for example of the type of beverage capsules, in an alternate manner along single file rows.

STATE OF THE ART

Arranging objects in single file rows is useful in order to reduce the space occupied by the objects themselves, so that they can be packed in packages as less bulky as possible. Various devices are known at the state of the art for arranging objects comprising a first end and a protruding edge placed close to the first end, for example capsules for preparing beverages such as coffee or the like, in single file rows for subsequent packaging of the same.

The devices of the known type have, however, several drawbacks. In fact, known devices are often complex and expensive to implement. Moreover, the devices known at the state of the art are bulky. They imply indeed the use of structures, such as guides for transporting objects, that are long and that follow articulated paths.

For example, the machine described in the patent EP 3 002 224 B1 is known at the state of the art. This machine is very effective in orienting objects in an alternate manner; however, it is necessary that the objects are initially arranged in two rows, therefore the machine is bulky. Moreover, two handling systems rotating the objects are required in order to alternate them.

Also known at the state of the art is the machine described in patent EP 3 375 719 B1. This machine is very effective in orienting objects in an alternate manner, but it is based on a rather complex rotation mechanism which does not allow objects to be quickly oriented in an alternate manner.

It is therefore an object of the present invention to solve, at least partially, the above-mentioned problems.

More particularly, it is an object of the present invention to provide a machine for arranging objects, comprising a first end and a protruding edge placed in proximity of the first end in an alternate manner in single file rows, which is simple, compact and cheap to produce. It is further an object of the present invention to provide a machine which is space-saving and thus provides short and simple paths for the objects to be ordered. It is further an object of the present invention to provide a method for arranging objects, comprising a first end and a protruding edge placed near the first end in an alternate manner in single file rows, which is simple and efficient.

SUMMARY OF THE INVENTION

The present invention is based on the idea of providing a machine for orienting objects in an alternate manner, wherein the objects, initially guided along a single file row, are alternately directed towards a first group of guides, suitable for orienting them according to a first orientation, and towards a second group of guides, suitable for orienting them according to the opposite orientation, and in which the objects coming from the two groups of guides finally converge in a single column and are stacked with alternate orientations.

In the context of the present invention, the expression "objects oriented in an alternate manner" means that objects are arranged one above the other so as to be parallel to each other, but are oriented in opposite directions. Specifically, the corresponding ends of adjacent objects point in opposite directions. The objects are oriented so that the first end, including the protruding edge, of the first object is in contact with the second end, opposite to the protruding edge, of the second object, which in turn is in contact with the first end, including the protruding edge, of the third object, and so on. This alternated structure is repeated throughout the single file row.

According to the present invention, a machine is provided for arranging objects comprising a first end and a protruding edge placed in proximity of the first end, in an alternate manner along single file rows, comprising:

guiding means configured to guide objects in an single file row so that they lay on the first end;

separating means suitable for separating objects into a first group and a second group;

collecting and dropping means suitable for receiving the objects of the first group and the objects of the second group and for dropping them along the same direction Y, preferably perpendicular to the ground, wherein the collecting and dropping means comprise first rotation means suitable for rotating the objects of the first group in a clockwise direction along a first arc of circumference during the fall, so that, at the end of the rotation, the objects do not lay on the first end, and second rotation means for rotating the objects of the second group in a counterclockwise direction along a second arc of circumference during the fall, for example so that, at the end of the rotation, the objects no longer lay on the first end, wherein the first and the second arc of circumference are formed on a plane parallel to the Y direction, so as to stack the objects one on top of the other in an alternate manner along single file rows. The machine is characterized in that the separating means are suitable for receiving the objects from the single file row and subsequently separating them into the first and second groups, and are configured to alternately transport the objects towards the first and second rotation means, respectively. In other words, the separating means are configured to receive a first object from the guiding means and transport it towards the first rotation means, then a second object from the guiding means and transport it towards the second rotation means, then a third object from the guiding means and transport it towards the first rotation means, and so on.

This configuration is particularly advantageous because it effectively allows objects to be stacked one on top of the other in an alternate manner along single file rows. In this way, the objects are placed one on top of the other in such a way as to occupy as little space as possible and are ready to be packed appropriately. Moreover, the machine according to this configuration is particularly simple and compact, because the objects are initially arranged in a single row and therefore occupy little space. The separation of the objects into two groups and the transport to the corresponding rotation means, according to the group they belong to, is also carried out easily and quickly by the separating means, which are able to connect the guiding means with the collecting and dropping means.

Preferably, the guiding means are movable elements capable of transporting a single file row of objects to the separating means. For example, the guiding means may comprise a conveyor belt or conveyor tracks.

Preferably, the guiding means are placed on a plane parallel to the ground.

Preferably, the separating means comprise movable elements suitable for receiving the objects from the guiding means and are configured to transport them alternately to the first rotation means and to the second rotation means, thereby dividing the objects into two groups. Even more preferably, the separating means are placed in the same plane as the guiding means.

According to a preferred configuration of the present invention, the collecting and dropping means comprise at least one guide, for example a vertical guide, suitable for containing a single file row of said objects.

According to another embodiment of the present invention, a machine for arranging objects is provided, wherein the separating means are configured to accommodate, one after the other, the objects coming from the single file row when receiving them from the guiding means.

The advantage of this configuration is that the objects coming from the single file row of the guiding means are accommodated in the separating means, one at a time, in an ordered and precise manner, and therefore they maintain their initial orientation. In addition, the fact that the objects are handled individually makes it possible to alternate the transport of the objects to the collecting and dropping means and thus to obtain a final alternated orientation of the objects.

According to another embodiment of the present invention, a machine for arranging objects is provided, wherein the separating means comprise at least one rotatable element, for instance a single rotatable element, suitable for accommodating an object from the single file row and transporting it alternately to the first and second rotation means, rotating alternately counterclockwise and clockwise with respect to an axis parallel to the Y direction.

This configuration is particularly advantageous because the transport of the objects from the guiding means to the collecting and dropping means takes place by means of an alternate rotation of the separating means, counterclockwise and clockwise with respect to the axis parallel to the Y direction, therefore the transport is particularly rapid and efficient.

According to a preferred embodiment, a machine for arranging objects is provided, wherein the separating means comprise a single rotatable element suitable for accommodating at least an object from the single file row and transporting it alternately to the first and second rotation means, by rotating alternately counterclockwise and clockwise with respect to an axis parallel to the Y direction.

According to another embodiment of the present invention, a machine for arranging objects is provided, wherein the separating means comprise a first guide and a second guide placed on a plane, preferably parallel to the ground, and suitable for rotating about an axis perpendicular to said plane and suitable for accommodating objects, wherein objects accommodated in the first guide, laying on the first end, are rotated in a counterclockwise direction along a third arc of circumference defined on said plane and brought to the first rotation means, while the objects placed in the second guide, laying on the first end, are rotated in a clockwise direction along a fourth arc of circumference defined on said plane and brought to the second rotation means.

This configuration is particularly advantageous because, by exploiting the rotation of two guides placed on the same plane, the separating means allow to optimize the transport of the objects from the guiding means to the collecting and dropping means. In fact, while an object is accommodated in a guide of the separating means, another object previously accommodated in the other guide of the separating means is delivered to the collecting and dropping means. The alternate rotation of the separating means in an anticlockwise and clockwise direction allows one guide to be continuously brought to the suitable position for loading a new object onto the separating means and the other guide to the suitable position for releasing another object to the collecting and dropping means.

In other words, initially a first object is placed in the first guide and both guides are rotated counterclockwise, so that the first guide reaches the collecting and dropping means in the direction of the first rotation means and the second guide arrives at the guiding means to receive a second object. Subsequently, both guides are rotated clockwise so that the second guide arrives at the collecting and dropping means in the direction of the second rotation means and the first guide arrives at the guiding means to receive a third object. It is evident that the directions of the rotations could be reversed and that the separating means could rotate first clockwise and then anticlockwise without altering the overall operation of the machine.

According to another embodiment of the present invention, a machine for arranging objects is provided, wherein the first and second guides form a predefined angle, preferably of 90°, with each other, and the counterclockwise rotation of the objects along the third arc of circumference and the clockwise rotation of the objects along the fourth arc of circumference correspond to said predefined angle.

This configuration is particularly advantageous because it allows the transport of objects from the guiding means to the collecting and dropping means in a particularly fast and efficient way.

In fact, a counterclockwise or clockwise rotation of the separating means equal to this predefined angle makes it possible to align one guide of the separating means with the guiding means and, at the same time, to align the other guide of the separating means with the first or second rotation means, respectively.

According to another embodiment of the present invention, a machine for arranging objects is provided, wherein the plane on which the guides lay is configured to form a first opening and a second opening placed in correspondence of the first and of the second rotation means, respectively, so that the objects accommodated in the first guide are free to fall through the corresponding opening until they reach the first rotation means and the objects accommodated in the second guide are free to fall through the corresponding opening until they reach the second rotation means.

This configuration is particularly advantageous because the objects are free to fall, by gravity, through these openings, until they reach the first and second rotation means, therefore the transfer from the separating means to the collecting and dropping means is simple and fast.

According to a preferred configuration, the separating means comprise a first and a second guide located in a single plane and said plane has two openings, each located above the first and the second rotation means respectively. When the first or second guide reaches the first or the second opening respectively, the object is no longer supported by the plane of the separating means and therefore falls through the first or the second opening.

According to another embodiment of the present invention, a machine is provided wherein:

the guiding means are configured to guide objects in two or more single file rows so that these objects lay on the first end;

the collecting and dropping means comprise two or more first rotation means and two or more second rotation means respectively; and the rotatable element is suitable for simultaneously accommodating two or more objects, each coming from a corresponding single file row, and for carrying them alternately to the corresponding two or more first rotation means and to the corresponding two or more second rotation means, by rotating alternately counterclockwise and clockwise about an axis parallel to the Y direction.

This configuration is particularly advantageous because it allows the simultaneous formation of two or more single file rows of objects, oriented in an alternate manner, and therefore to speed up the packaging formation times.

According to another embodiment of the present invention, a machine is provided, further comprising:

means for the formation of rows comprising one or more exit guides suitable for containing the objects, arranged in an alternate manner along single file rows, from the collecting and dropping means and configured to be translated in a direction perpendicular to the Y direction, in both ways, by a step at least equal to the width of a single exit guide.

This configuration is particularly advantageous because it allows to stack the objects coming from the collecting and dropping means in the means of formation of the rows comprising one or more exit guides, in an alternate manner along single file rows. The means of formation of the rows can be moved along a direction D perpendicular to Y, either to the right or to the left, in order to align the exit guides with the collecting and dropping means and to collect the stacked objects in an alternate manner along single file rows.

According to a preferred embodiment of the present invention, the means of formation of the rows are configured so that, while one or more exit guides are filled with the objects from the collecting and dropping means, the remaining one or more exit guides, containing the objects stacked in an alternate manner, can be emptied so as to fill one or more packages placed in correspondence of the means of formation of the rows. At the end of this procedure, the means of formation of the rows may be shifted so as to bring the empty exit guide(s) in correspondence with the collecting and dropping means to be filled with the objects stacked in an alternate manner, and to bring the remaining one or more exit guides containing the objects in correspondence with the package(s) to be filled, and so on.

According to the present invention, a method for arranging objects comprising a first end and a protruding edge placed in proximity of the first end, in an alternate manner along single file rows is provided, the method comprising the following steps:

a) guiding the objects in a single file row so that they lay on the first end;

b) separating the objects into a first and a second group;

c) alternately dropping the objects belonging to the first group and the objects belonging to the second group in the same direction Y, preferably perpendicular to the ground;

d) rotating, during the dropping step, the objects belonging to the first group clockwise along a first arc of circumference so that, at the end of the rotation, the objects no longer lay on the first end, and rotating, during the dropping step, the objects belonging to the second group counterclockwise along a second arc of circumference so that, at the end of the rotation, the objects no longer lay on the first end, wherein the first and the second arc of circumference are defined on a plane parallel to the direction Y, so as to stack the objects one on top of the other in an alternate manner along single file rows.

The method is characterized in that, the step b) is carried out by alternately transporting the objects towards a first direction in order to feed the first group and towards a second direction in order to feed the second group.

This configuration is particularly advantageous because it effectively allows objects to be stacked one on top of the other in an alternate manner along single file rows. In this way, the objects are placed one on top of the other in such a way as to occupy as little space as possible and are ready to be packed appropriately. Moreover, this method is particularly simple to implement, because it is based on the principle of separating into two groups the objects coming from a single row and having the same predefined orientation, and of directing the objects of each group towards the corresponding means, suitable for orienting them according to another predefined orientation, so that the objects are finally stacked in an alternate manner.

According to another embodiment of the present invention, a method for arranging objects is provided, wherein the steps (b), (c) and (d) are performed in such a way that, while a first object which has been transported towards the first direction to feed the first group A is dropped along the Y direction and is rotated, a second object is transported towards the second direction to feed the second group B.

This configuration has the advantage of optimizing the transport of the objects from the guiding means to the collecting and dropping means through the separating means, so that the transport is particularly fast and efficient. In fact, the transport of an object along the direction of the corresponding rotation means takes place simultaneously with respect to the fall and rotation of an object previously transported up to the corresponding rotation means.

According to another embodiment of the present invention, a method for arranging objects is provided, further comprising the step of accommodating the objects, by keeping them laying on the first end, in separating means suitable for moving alternately towards the first and the second direction, wherein this step is carried out prior to step b).

This configuration has the advantage of making the transport of objects from the guiding means to the collecting and dropping means through the separating means particularly fast and efficient. In fact, the separating means move continuously, alternately in one direction and in the opposite direction, to transport the objects to be arranged.

According to another embodiment of the present invention, a method for arranging objects is provided, wherein the movement of the separating means during the step e) consists of an alternate counterclockwise and clockwise rotation about an axis parallel to the Y direction.

This configuration has the advantage of making the transport of the objects from the guiding means to the collecting and dropping means through the separating means particularly fast and efficient. In fact, the separating means move continuously, alternately counterclockwise or clockwise, to transport the objects to be arranged.

According to another embodiment of the present invention, a method for arranging objects is provided, wherein the objects are rotated about the axis X alternately counterclockwise and clockwise, describing respectively a third and a fourth arc of circumference placed on the same plane.

This configuration has the advantage of making the transport of the objects from the guiding means to the collecting and dropping means through the separating means particularly fast and efficient. In fact, the separating means move continuously, alternately clockwise or counterclockwise, to transport the objects to be arranged. In particular, the alternate rotation of the separating means on the same plane is easy to implement.

According to another embodiment of the present invention, a method for arranging objects is provided, wherein the step (c) further comprises the step of dropping the objects in free fall, and this step is carried out prior to the step d).

This configuration has the advantage of exploiting the fall of the objects by gravity to make them pass from the separating means to the collecting and dropping means, which are suitable for rotating them according to a predefined orientation. The method is therefore particularly simple to implement.

According to another embodiment of the present invention, a method for arranging objects is provided, wherein the step a) is carried out so as to guide the objects in two or more single file rows so that said objects lay on the first end, and the step b) is carried out so as to alternately transport two or more objects respectively towards a first direction so as to feed the first group and towards a second direction so as to feed the second group.

This configuration is particularly advantageous because it allows the simultaneous formation of two or more single file rows of objects, oriented in an alternate manner, and therefore to speed up the times of formation of the packages.

According to another embodiment of the present invention, a method is provided, further comprising the following step:

g) stacking the objects, one on top of the other in an alternate manner along single file rows, within means of formation of the rows including one or more exit guides, wherein the step g) is carried out at the end of the step d) and in such a way that, while one or more exit guides are filled with the objects from the collecting and dropping means, one or more exit guides containing the objects, stacked on top of each other in an alternate manner along single file rows, are used to fill one or more packages.

This configuration is particularly advantageous because it allows the stacking of objects coming from the collecting and dropping means in the means of formation of the rows including one or more exit guides, in an alternate manner along single file rows, so as to optimize the time of filling the exit guides with new stacked objects and of emptying the exit guides to form packages.

According to another embodiment of the present invention, a method for packing a predetermined number of objects in an alternate manner along single file rows in a package is provided, wherein the method comprises arranging the objects in an alternate manner along single file rows according to one of the methods described above.

This results in small, compact packages whose internal volume is well-organized.

BRIEF DESCRIPTION OF THE FIGURES

The present invention will be described with reference to the enclosed figures, in which the same reference numbers and/or signs indicate the same and/or similar and/or corresponding parts of the system.

DETAILED DESCRIPTION OF THE INVENTION

In the following, the present invention is described with reference to particular embodiments as illustrated in the attached figures. However, the present invention is not limited to the particular embodiments described in the following detailed description and illustrated in the figures, but rather the illustrated embodiments simply exemplify various aspects of the present invention, the scope of which is defined by the claims. Further modifications and variations of the present invention will appear clear to those skilled in the art.

A particular embodiment of a machine for arranging objects T, comprising a first end Te including a protruding edge Tb, in an alternate manner along single file rows F, is shown in FIGS. 2 to 8 at various stages of its use.

Figure 1A:
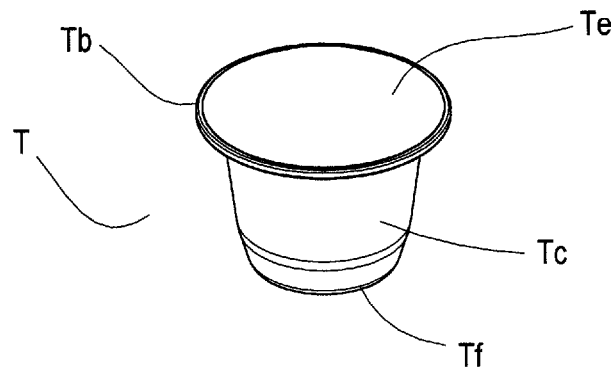
FIG. 1a schematically illustrates a three-dimensional view of an object comprising a first end and a protruding edge located near the first end.

Objects T of the type indicated may comprise capsules for producing beverages, for example espresso, such as those schematically illustrated in FIG. 1a.

The capsule shown in FIG. 1a comprises a truncated cone body Tc, a first end Te from which protrudes, towards the outside of the body Tc, an edge Tb and a second end Tf corresponding to the bottom of the capsule. The soluble and/or infusion product for the production of beverages, for example ground coffee, is contained inside the body Tc of the capsule.

Figure 1B:
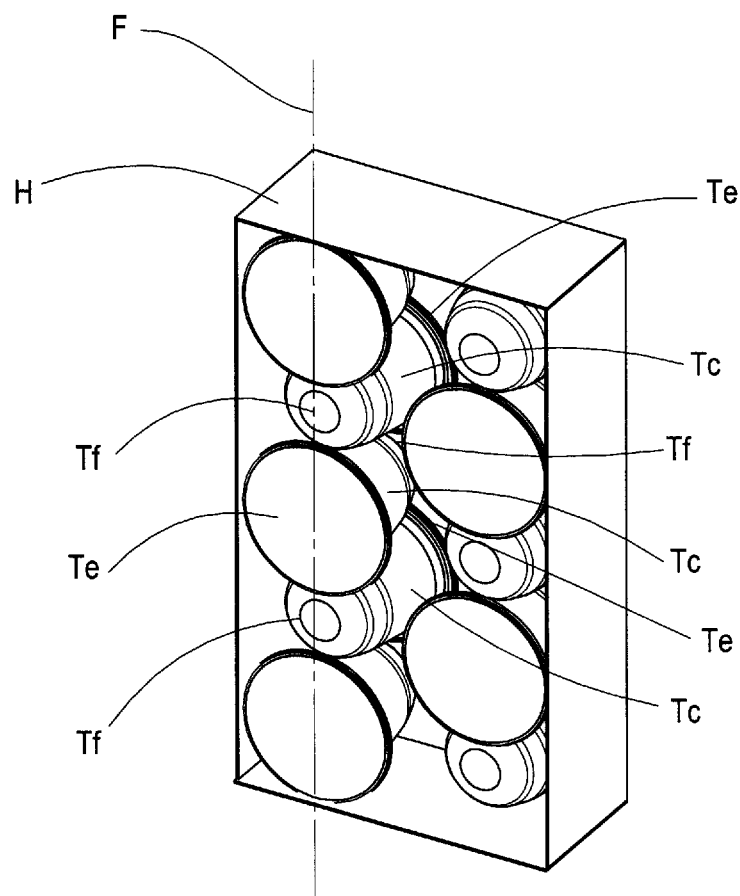
FIG. 1b schematically illustrates a three-dimensional view of an example of a package comprising objects arranged in an alternate manner in single file rows, by the machine and/or by the method for arranging objects in an alternate manner along single file rows, according to the present invention.

An example of a package is shown in FIG. 1b, in which the capsules shown in FIG. 1a are arranged in an alternate manner along single file rows F, by use of the machine and/or the method according to the present invention.

The package H shown in the figure comprises twelve capsules arranged along two single file rows F, in an alternate manner, wherein each single file row F comprises six capsules.

In particular, the capsules are arranged one on top of the other so as to be substantially parallel to each other. However, the capsules are oriented in opposite directions. In particular, corresponding ends of adjacent capsules point in opposite directions. That is, the capsules are oriented such that the first end Te, comprising the protruding edge Tb, of the first capsule is in contact with the second end Tf of the second capsule, which in turn is in contact with the first end Te comprising the protruding edge Tb of the third capsule, and so on. This alternated structure is repeated throughout the single file row.

More particularly, the bodies Tc of the capsules are in contact with each other and the first end Te of the first capsule is in contact with the second end Tf of the second capsule, which, in turn, is in contact with the first end Te of the third capsule and so on. In this way, as shown in the figure, the stacking space is optimized.

The machine M for arranging objects T in an alternate manner along single file rows, according to a particular embodiment of the present invention shown in FIG. 2-8, comprises guiding means 10, in which the objects T are initially oriented so as to lay on their first end Te; it further comprises separating means 20 for receiving and separating the objects T into a first group A and a second group B, according to two different directions; it further comprises collecting and dropping means 30 suitable for receiving the objects T of the first group A and the second group B and dropping them along a same direction Y, preferably perpendicular to the ground. The collecting and dropping means 30 further comprise first (31A) and second (31B) rotation means.

Figure 2:
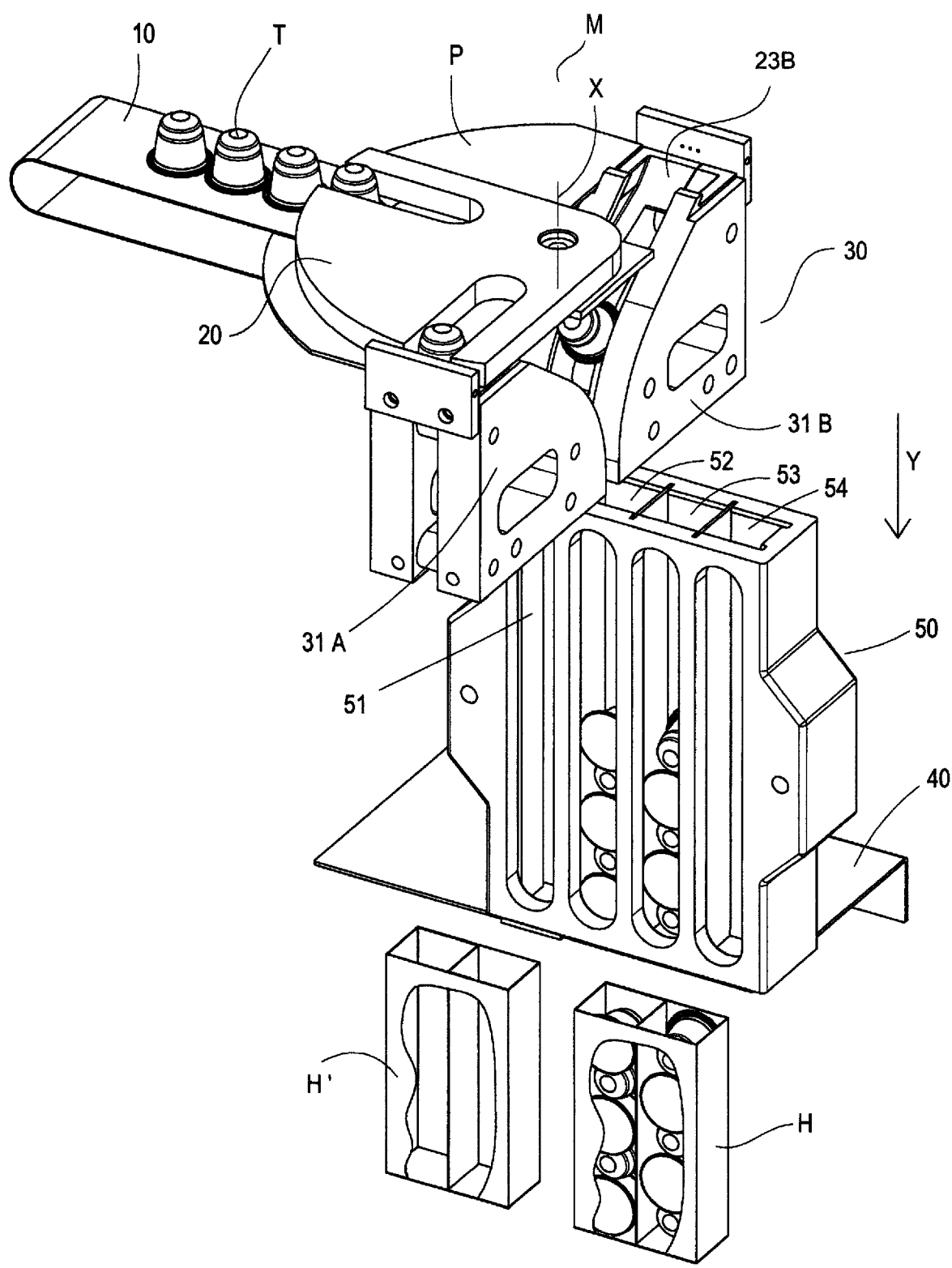
FIG. 2 schematically illustrates a three-dimensional view of a machine for arranging objects according to an embodiment of the present invention.
Figure 3:
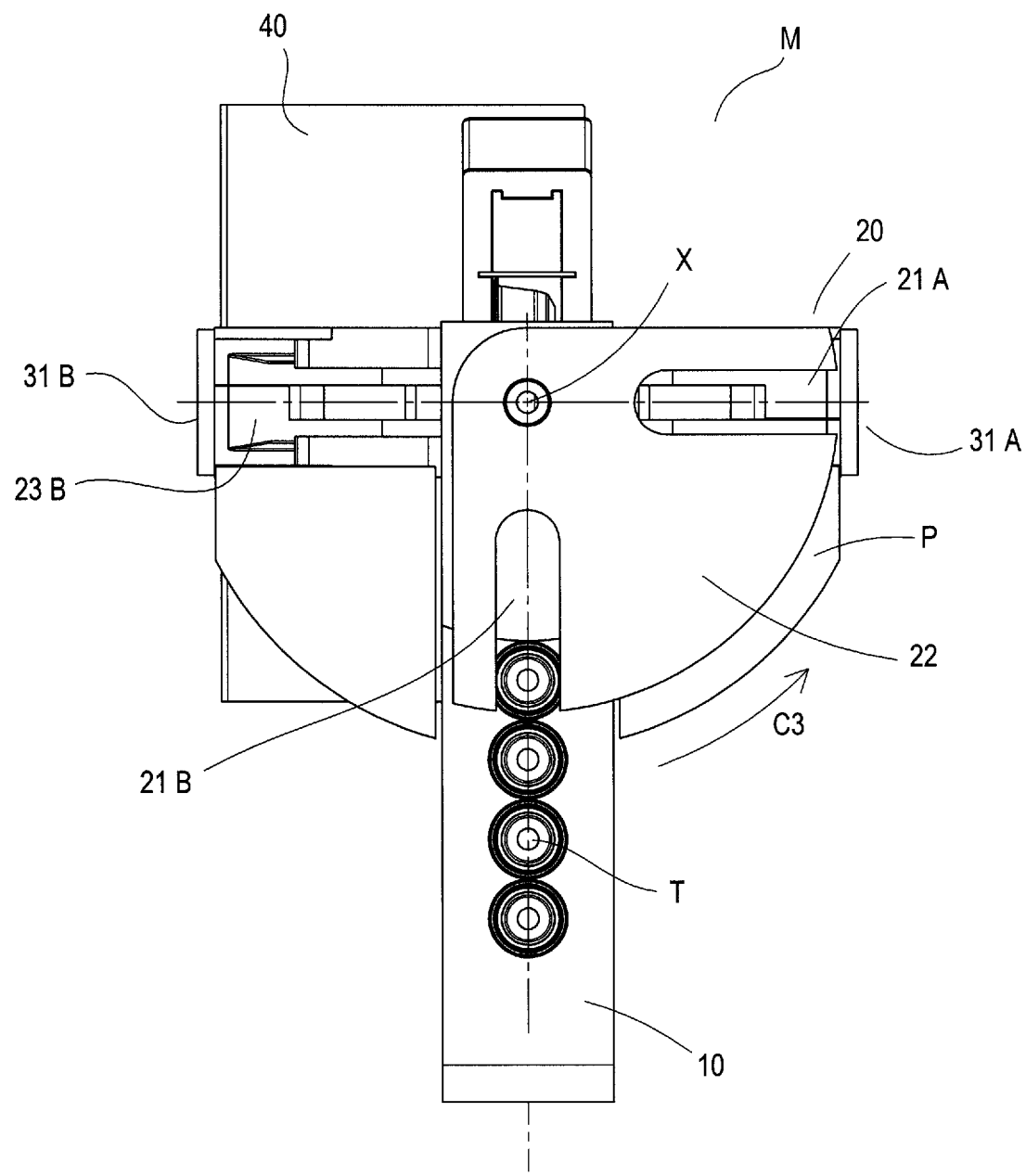
FIG. 3 schematically illustrates a top view of the machine for arranging objects shown in FIG. 2, in a stage of use.
Figure 4:
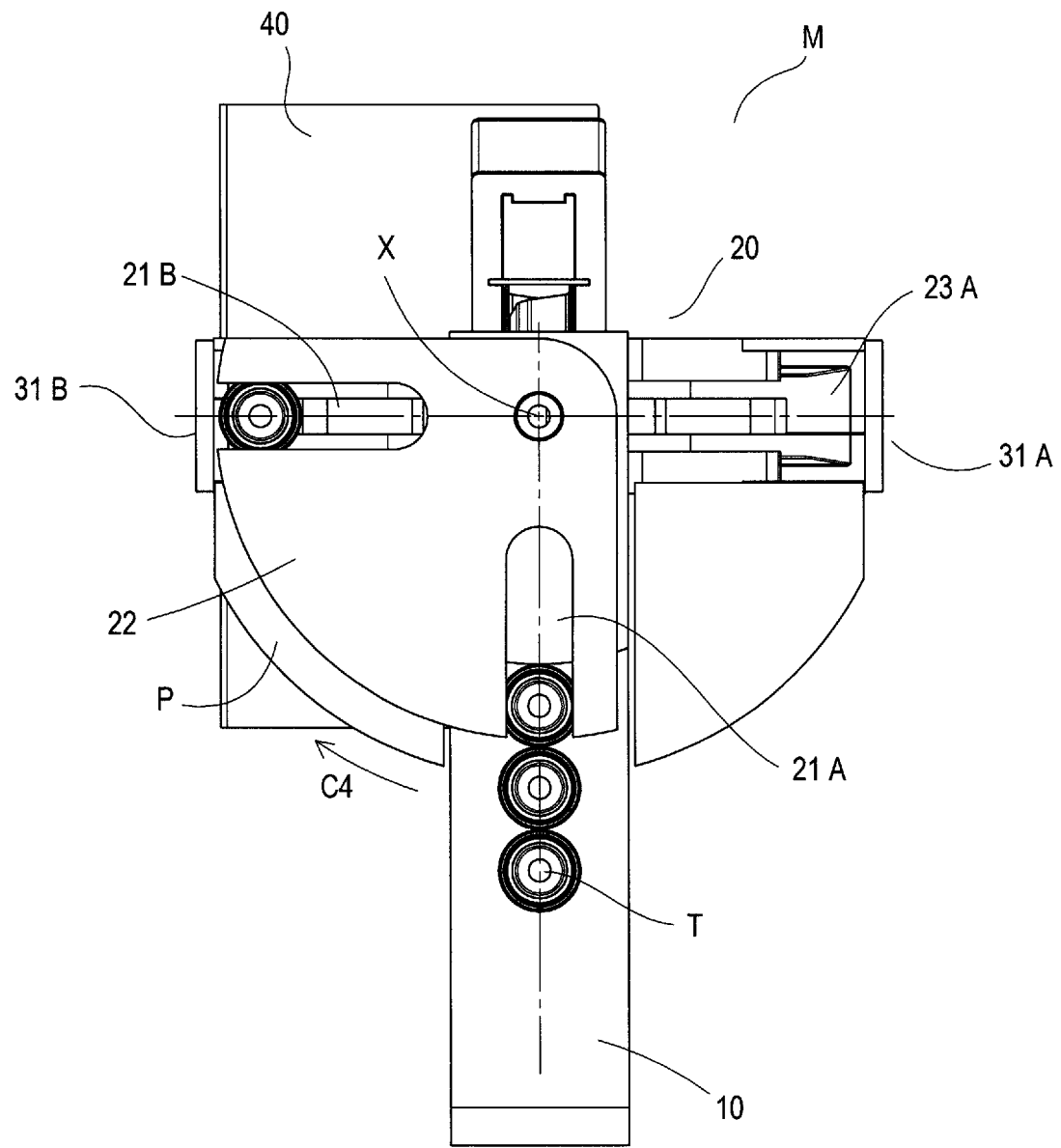
FIG. 4 schematically illustrates a top view of the machine for arranging objects shown in FIG. 2, at a further stage of use.
Figure 8:
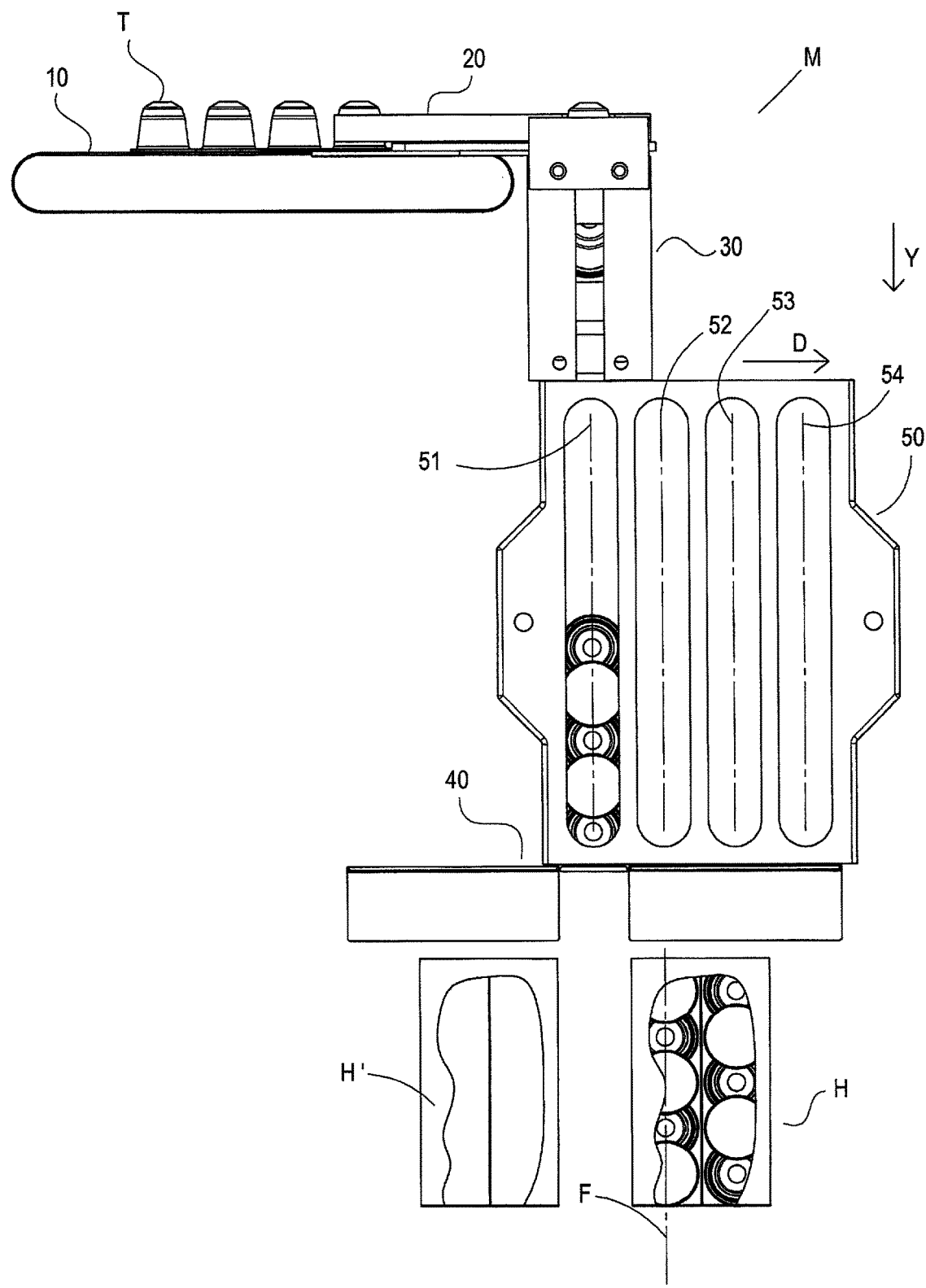
FIG. 8 schematically illustrates a side view of the machine for arranging objects shown in FIG. 7, at a further stage of use.

The guiding means 10 may be formed by any element capable of guiding the objects T towards the separating means 20. In FIGS. 2 and 8, the guiding means 10 are represented by a conveyor belt. However, it is clear that such guiding means 10 could also be guides having their walls preferably slightly more distant than the width of the protruding edge Te of the object T, for example conveyor tracks.

The objects T transported along the guiding means 10 preferably all have the same orientation, which, in the particular case depicted in FIGS. 2-8, corresponds to having the protruding end Te facing the support plane of the guiding means 10. However, it is clear that the orientation could also be the opposite, i.e. with the second end Tf facing the support plane of the guiding means 10.

The separating means 20 comprise movable elements capable of receiving the objects T from the guiding means 10 and are configured to transport them alternately to the first rotation means 31A and to the second rotation means 31B, thereby dividing the objects T into two groups, respectively group A and group B, located on opposite sides with respect to the guiding means 10.

The separating means 20 shown in FIGS. 2-8 comprise a rotatable element 22 with a first guide 21A and a second guide 21B placed on a same plane P, capable of rotating about an axis X perpendicular to said plane P. Preferably, the plane P is parallel to the ground. For example, the separating means 20 may further comprise actuation means, for example an electric motor, suitable for moving the first and the second guides 21A and 21B.

The guides 21A and 21B have walls spaced slightly more than the width of the protruding edge Te of the objects T and therefore they can accommodate said objects T. Preferably, the objects T are oriented such that the protruding end Te faces the support plane of the separating means 20. However, it is clear that the orientation could also be the opposite, i.e. that the second end Tf faces the support plane of the separating means 20.

The first guide 21A and the second guide 21B form with each other a predefined angle, preferably of 90°. The guiding means 10, the first rotation means 31A and the second rotation means 31B are configured to form with each other angles equal to said predefined angle, preferably they are placed 90° apart.

The separating means 20, by making a rotation equal to said predefined angle, rotate both guides 21A and 21B, simultaneously, by an angle equal to said predefined angle. In this way, when the first guide 21A is aligned with the guiding means 10, the second guide 21B is aligned with the second rotation means 31B; when, following a counterclockwise rotation equal to said predefined angle, the first guide 21A is brought in correspondence with the first rotation means 31A, the second guide 21B is brought in correspondence with the guiding means 10 (as shown in detail in FIG. 3). Similarly, when, following a clockwise rotation equal to said predefined angle, the first guide 21A is brought into line with the guiding means 10, the second guide 21B is brought into line with the second rotation means 31B (as shown in detail in FIG. 4).

The rotation of the separating means 20 is alternately adjusted counterclockwise and clockwise, so that a first object T coming from the guiding means 10 is accommodated in the first guide 21A and transported towards the first rotation means 31A, by means of a counterclockwise rotation of the separating means 20 along a third arc of circumference C3 defined on the plane P, and that, at the same time when the first object T is dropped to the first rotation means 31A, a second object is accommodated in the second guide 21B. When the separating means are rotated clockwise, the objects T accommodated in the second guide 21B are rotated along a fourth arc of circumference C4 defined on the plane P and transported to the second rotation means 31B, while the first guide 21A returns to the alignment position with the first guiding means 10 to receive a third object T. A new counterclockwise rotation of the separating means 20 rotates the third object T placed in the guide 21A along the third arc of circumference C3 and carries it to the first rotation means 31A, while the second guide 21B is again aligned with the guiding means 10, and so on. The alternate rotation of the separating means 20 is repeated until the objects T to be arranged are finished.

It is evident that, even if it has been described that the rotation of the separating means 20 is first counterclockwise and then clockwise, the working principle of the machine M would not change even if the rotation were to first move clockwise and then counterclockwise.

According to a preferred configuration shown in FIGS. 2-8, the separating means 20 may comprise a single rotating element, in the shape of a circular sector, with a first slot 21A and a second slot 21B, which act as housings for the objects T. For example, the rotating element of FIG. 2-8 may have the shape of a quarter of a disc. The alternate rotation of the single rotating element in the shape of a circular sector in both directions of rotation alternately brings the first slot 21A and the second slot 21B in line with the guiding means 10 to receive the objects T to be divided into the two groups.

Figure 5:
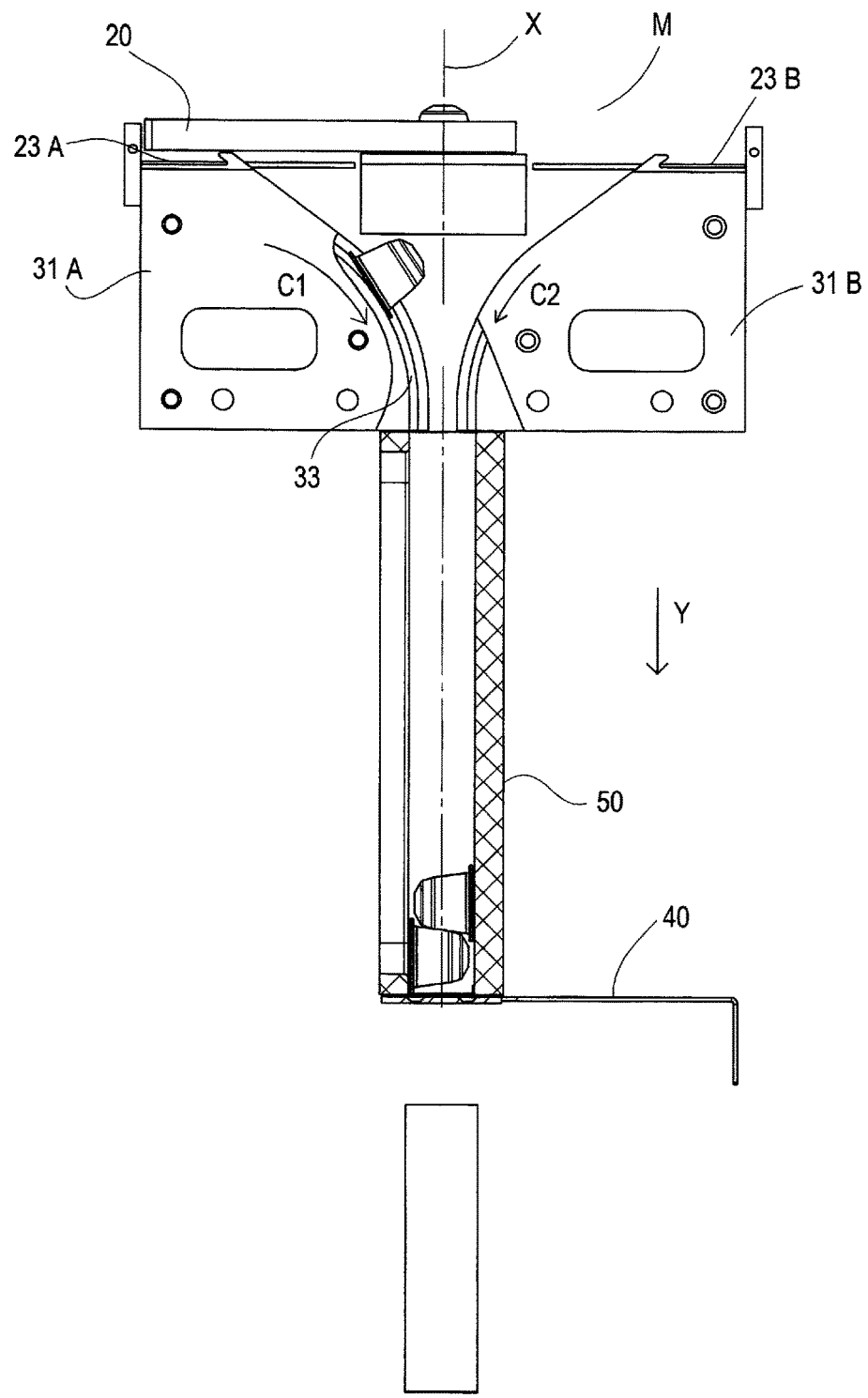
FIG. 5 schematically illustrates a front view of the machine for arranging objects shown in FIG. 2, in a stage of use.

As can be seen in FIG. 5, when the objects T, accommodated in the first guide, reach the first rotation means 31A, they come across the first opening 23A located below the first guide of the separating means 20 and above the first rotation means 31A and fall through the first opening 23A by gravity, thus reaching the first rotational means 31A. When the objects T come across the opening 23A, they are no longer supported by the first guide of the separating means 20 and the plane below and are therefore free to fall.

Figure 6:
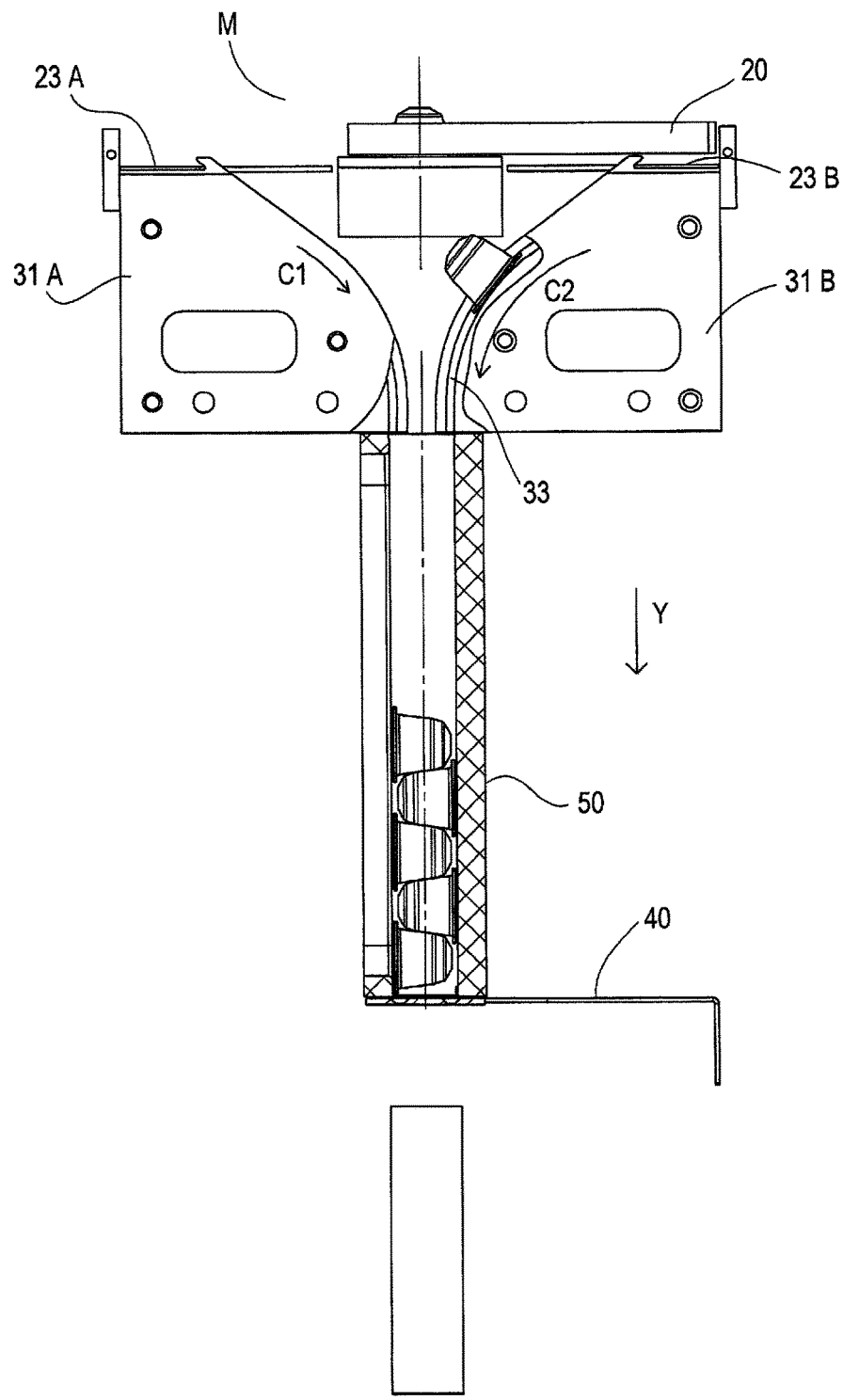
FIG. 6 schematically illustrates a front view of the machine for arranging objects shown in FIG. 2, at a further stage of use.

Similarly, as can be seen in FIG. 6, when the objects T, accommodated in the second guide, reach the second means of rotation 31B, they come across a second opening 23B located below the second guide of the separating means 20 and above the second means of rotation 31B and fall through the second opening 23B by gravity, thus reaching the second means of rotation 31B. When the objects T come across the second opening 23B, they are no longer supported by the second guide of the separating means 20 and the plane below and are therefore free to fall.

The first rotation means 31A are configured to rotate the objects T of the first group A clockwise along a first arc of circumference C1 during the fall so that, at the end of the rotation, said objects no longer lay on the first end Te; the second rotation means 31B are configured to rotate the objects of the second group B counterclockwise along a second arc of circumference C2 during the fall so that, at the end of the rotation, said objects T no longer lay on the first end Te. These first arc of circumference C1 and second arc of circumference C2 are defined on a plane parallel to the direction Y of the fall.

The clockwise rotation of the objects of the first group A along the first arc of circumference C1 and the counterclockwise rotation of the objects of the second group B along the second arc of circumference C2 may be substantially 90°.

As shown in detail in FIGS. 5 and 6, the first rotation means 31A comprise a first guide having the profile of a first arc of circumference C1, along which the objects T slide until they reach the predefined orientation. The objects slide along said first guide without falling, since the protruding edge Tb of the objects is accommodated in an arched slit 33. Similarly, the second rotation means 31B comprise a second guide having the profile of a second arc of circumference C2, along which the objects T slide until they reach the predefined orientation. The objects slide along said second guide without falling, since the protruding edge Tb of the objects is accommodated in an appropriate arched slit 33.

In fact, the arched slit 33 of the first rotation means 31A ensures, by holding within it the edge Tb of the objects T of the first group A, the rotation of substantially 90° of the objects, so that at the end of the rotation they no longer lay on their first end Te (see FIG. 5). Similarly, the arched slit 33 of the second rotation means 31B ensures, by holding within it the edge Tb of the objects of the second group B, the rotation of substantially 90° of the objects, so that at the end of the rotation the objects T2 no longer lay on their first end Te (see FIG. 6).

Moreover, the first and the second rotation means 31A and 31B are realized so that the first and the second arcs of circumference C1 and C2, along which the objects T of the first group A and of the second group B rotate, respectively, are defined on a plane Z parallel to the direction of fall Y, so as to stack the objects T one on top of the other in an alternate manner along single file rows F.

It is therefore clear that the objects T fall along the direction Y according to two different types of motion: initially, they fall by gravity through the openings 23A and 23B until they reach the first and the second means of rotation 31A and 31B, respectively, while maintaining the same initial orientation; subsequently, they are dropped along the guides of the first and the second rotation means 31A and 31B respectively, while being rotated, and reach the means of formation of the rows 50.

The means of formation of the rows 50 preferably comprise a plurality of exit guides placed side by side, preferably vertical exit guides. In the examples depicted in FIG. 2 and FIGS. 7 to 9 four vertical exit guides 51, 52, 53, 54 are placed side by side. However, it is evident that such vertical exit guides could also be in a different number, for example one, two, three, five or more.

Each exit guide 51, 52, 53, 54 is suitable for containing at least one single file row of objects T.

In order for the first rotation means 31A and the second rotation means 31B to allow the objects T to be stacked on top of each other in an alternate manner along single file rows, the separating means are configured so that the objects T of the first group A and of the second group B, passing via the first rotation means 31A and the second rotation means 31B respectively, arrive in turn in a single guide 51, 52, 53, 54 of the means of formation of the rows 50.

Therefore, when the objects T reach one exit guide 51, 52, 53, 54, they are arranged one on top of the other in an alternate manner.

After a predetermined number of objects T has been guided within an exit guide of the means of formation of the rows 50, said exit guide containing the objects T may be translated along the translation axis D, together with the exit guides placed alongside.

Such translation along the translation axis D may be provided by displacement means, such as for example a linear motor.

Figure 7:
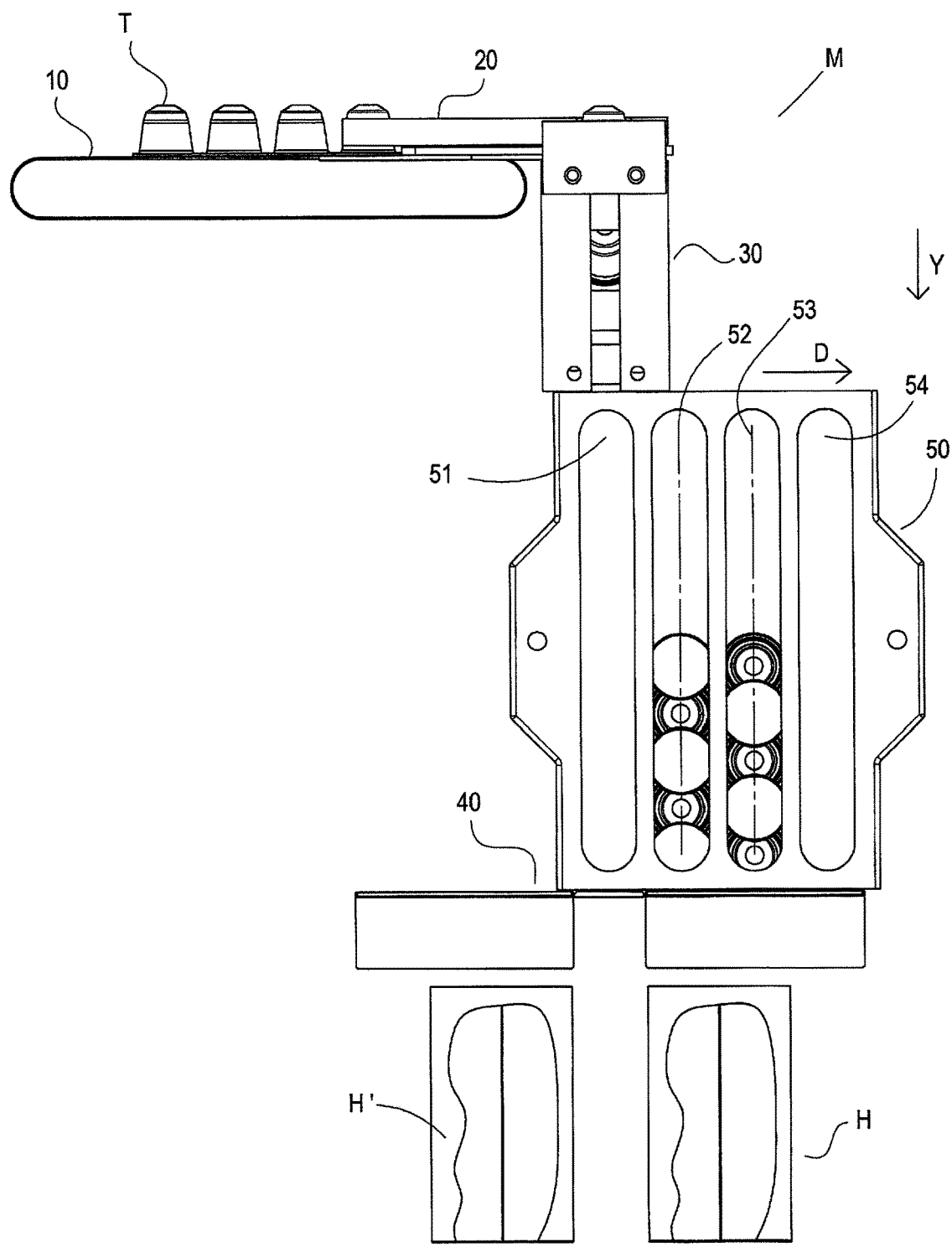
FIG. 7 schematically illustrates a side view of the machine for arranging objects shown in FIG. 2.

According to the example shown in FIG. 7, after the exit guide 53, which in the particular example presented in FIG. 7 is placed on the right, is translated towards the right in the direction indicated by the translation axis D, the objects can be guided into a second exit guide 52 placed on the left with respect to the exit guide 53. After the exit guide 52 has also been filled with a predetermined number of objects T, it may be translated to the right in the direction D, so that a new predetermined number of objects T may be guided into the third exit guide 51 located to the left with respect to the exit guide 52. The two adjacent exit guides 52,53, each containing a predetermined number of objects T, may be used to fill two adjacent rows F of objects T within a package H, placed therein.

The translation of the means of formation of the rows 50 along the direction D thus takes place by a step equal to at least the width of a single exit guide.

As shown in FIG. 8, the means of formation of the rows 50 are preferably configured so that, while the exit guides 52, 53 are emptied to fill the package H, the exit guide 51 aligned with the collecting and dropping means 30 is filled with a predetermined number of objects T.

After the exit guides 52, 53 have been emptied and the exit guide 51 has been filled with the objects T stacked in an alternate manner, the means of formation of the rows 50 may be moved in the direction opposite to that indicated by the axis D, to repeat the filling operations of the exit guides 52, 53 and to align the exit guide 51 with a new package H' to be filled.

It is clear that, even if it has been shown in FIG. 7-8 that, while the exit guides 52, 53 are emptied to fill the package H, the exit guide 51 is filled with a predetermined number of objects T coming from the collecting and dropping means 30, it is also possible to initially fill, for example, the exit guides 53, 54 and then use them to fill a package H aligned with them, and simultaneously stack a predetermined number of objects T in the guide 52, which will afterwards fill the package H'.

In general, the translation of the means of formation of the rows 50 of the machine M to the right or to the left along the direction D makes it possible to align an exit guide to be filled, for example the exit guide 51 or 52 or 53 or 54, with the collecting and dropping means 30 and to align one or more guides 51, 52, 53, 54, already containing the stacked objects T, with the package H to be filled, and thus to perform the operations of filling one exit guide and emptying one or more exit guides at the same time. This particular embodiment hence allows, for example, to quickly and efficiently fill cases or packages one after the other.

It is clear that, even if it has been described that the exit guide 52 is placed to the right of the exit guide 51 and that they are initially translated to the right along the direction D, it would also be possible to place the guide 52 to the left of the exit guide 51 and initially translate both guides to the left along the direction D, without substantially modifying the functioning of the machine M.

The machine M shown in FIGS. 2 to 8 further comprises first barrier means 40 suitable for blocking the fall of the objects T into the single file row F. When the objects T are dropped into a guide of the means of formation of the rows 50, the bottom thereof is closed by means of the first barrier means 40.

Figure 9:
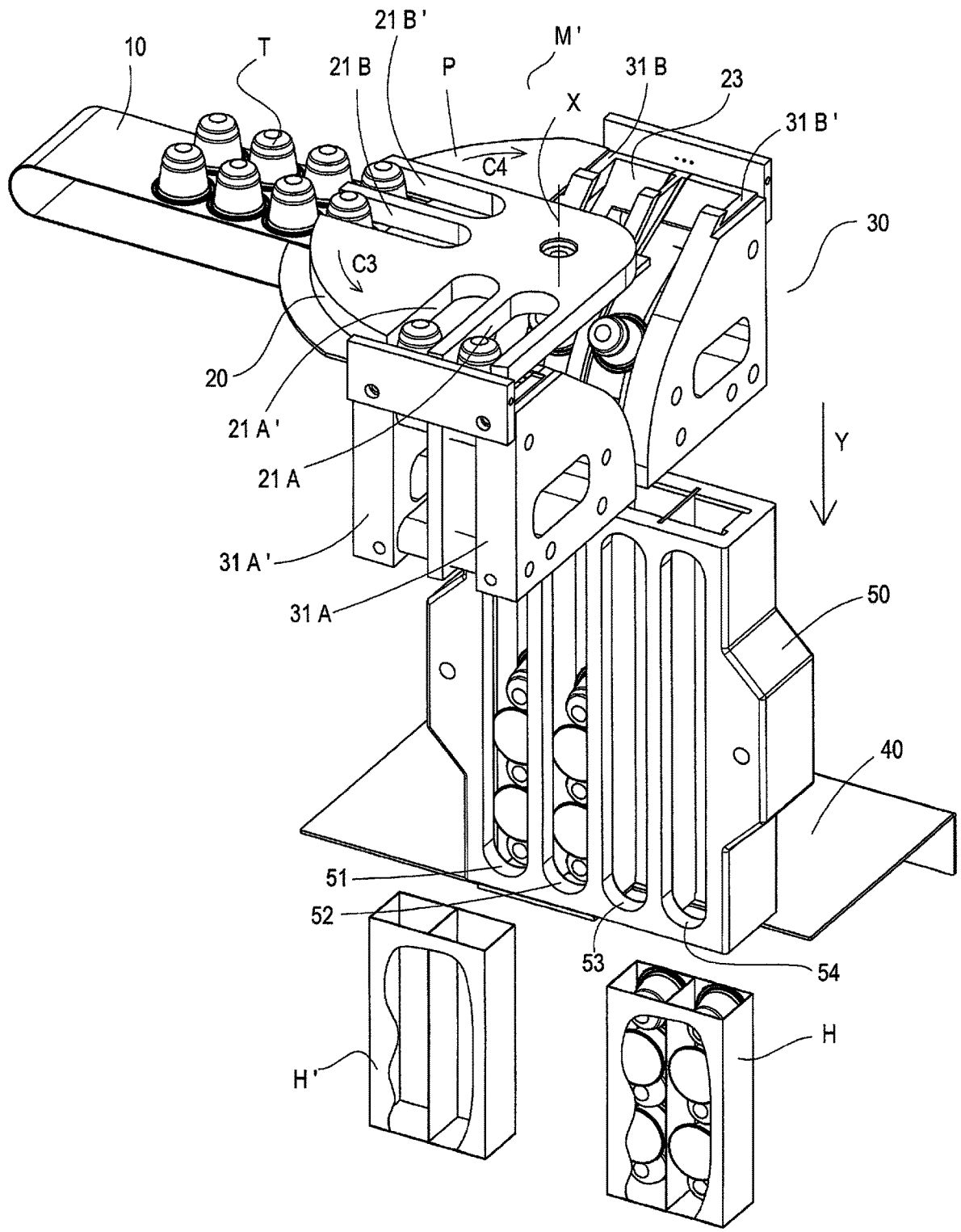
FIG. 9 schematically illustrates a three-dimensional view of a machine for arranging objects according to a further embodiment of the present invention.

FIG. 9 represents a further embodiment of a machine M' for arranging objects T in an alternate manner along single file rows F.

The machine M', according to a further embodiment of the present invention, comprises guiding means 10 configured to transport two or more parallel single file rows of objects T, wherein the objects T are initially oriented so as to lay on their first end Te.

The machine M', according to this further embodiment, comprises separating means 20 configured to simultaneously receive two or more objects T, each coming from a corresponding single file row, and to alternately transport them to the corresponding two or more first rotation means 31A, 31A' and to the corresponding two or more second rotation means 31B, 31B', alternately rotating counterclockwise and clockwise with respect to an axis parallel to the direction Y.

The two or more first rotation means 31A, 31A' and the corresponding two or more second rotation means 31B, 31B' are configured to drop the objects T along directions parallel to the direction Y, so that the objects of each group A or B from each single file row do not mix with the objects of each group A or B, respectively, from another single file row.

In the particular example of FIG. 9, two objects T belonging to two parallel single file rows are transported by the guiding means 10 until they simultaneously reach the separating means 20. One object T coming from the first row is accommodated in a first guide 21A, while a second object T coming from the second row is accommodated in a first guide 21A'.

The first guides 21A and 21A' are configured to simultaneously rotate counterclockwise along the third arc of circumference C3 so as to simultaneously transport the two objects T to the collecting and dropping means 30.

The separating means 20 are configured so that a counterclockwise rotation of the first guides 21A and 21A' positions the second guides 21B and 21B' at respective single file rows of the guiding means 10. In other words, while the first guides 21A and 21A' arrive at the first rotation means 31A and 31A' respectively, the second guides 21B and 21B' are positioned in correspondence with the respective single file rows of the guiding means 10, so as to receive two more objects T from two parallel rows.

Similarly, the separating means 20 are configured so that a successive clockwise rotation of the second guides 21B and 21B' positions the first guides 21A and 21A' again at the respective single file rows of the guiding means 10, and so on.

The two objects T, dropped by the first guides 21A and 21A' reach the first rotation means 31A and 31A', respectively, at the same time.

Similarly, the two objects T, dropped by the second guides 21B and 21B' reach the second rotation means 31B and 31B', respectively, at the same time.

At the end of the fall, the objects T from each set of rotation means 31A, 31B and 31A', 31B' are stacked on top of each other in an alternate manner along a single file row, so that the objects falling along the first first rotation means 31A do not mix with the objects falling along the second first rotation means 31A' and, similarly, the objects falling along the first second rotation means 31B do not mix with the objects falling along the second second rotation means 31B'.

In the particular example of FIG. 9 two single file rows of objects T are represented; however, it is clear that also three, four, five or more single file rows of objects T could be formed. In the particular example of FIG. 9, two sets of first guides 21A, 21A' and second guides 21B, 21B' are shown; however, it is clear that also three, four, five or more sets of first guides 21A, 21A' and second guides 21B, 21B' could be formed. In the particular example of FIG. 9 two sets of first rotation means 31A, 31A' and of second rotation means 31B, 31B' are represented; however, it is clear that also three, four, five or more sets of first rotation means 31A, 31A' and of second rotation means 31B, 31B' could be formed.

In general, the number of single file rows of objects T is preferably equal to the number of first guides 21A, 21A' and second guides 21B, 21B' and to the number of first rotation means 31A, 31A' and to the number of second rotation means 31B, 31B'.

Each row of stacked objects from a first set of rotation means 31A, 31B or a second set of rotation means 31A', 31B' feeds a single exit guide of the means of formation of the rows 50, so that a plurality of exit guides is simultaneously filled.

In the particular example of FIG. 9, two exit guides 51 and 52 are simultaneously filled. In this case, after a predefined number of objects T has been guided within each exit guide 51 and 52, the two exit guides 51 and 52 containing the objects T may be translated to the left so as to align the two new exit guides 53 and 54 to be filled with the first set of first and second rotation means 31A and 31B and with the second set of first and second rotation means 31A' and 31B'. The translation of the means of formation of the rows 50 thus takes place by a step at least equal to the width of two adjacent exit guides.

With reference to FIG. 9, it can be seen that while two exit guides, for example exit guides 51 and 52, are simultaneously filled with a predetermined number of objects T, the other exit guides, for example exit guides 53 and 54, previously filled with objects T, are used to fill a package H placed in correspondence with them. The means of formation of the rows 50 of the machine M' are also configured in such a way that they can then be shifted to the right, after the two exit guides 51 and 52 have been filled with a predetermined number of objects T, so as to bring the exit guides 51 and 52 in correspondence with a new package H' to be filled and to align the exit guides 53, 54 with the collecting and dropping means, in order to stack further objects, and so on. This particular embodiment thus makes it possible to quickly and efficiently fill, for example, cases or packages one after the other.

It is clear that, even if it has been described that the exit guides 51 and 52 are initially translated to the left, it would also be possible to initially translate both guides to the right, without substantially modifying the functioning of the machine M'. Furthermore, even if it has been described that initially the exit guides 53, 54 are used to fill the package H, while the exit guides 51, 52 are filled with the objects T, it is clear that the means of formation of the rows 50 could also be configured to initially fill a package H' with the exit guides 51, 52 and simultaneously fill the exit guides 53, 54.

It is also clear that, even if it has been described that two exit guides are used at a time (two guides are filled and two are emptied), one, three, four, five or more guides could be used at a time in order to fill a package H and simultaneously receive objects T stacked in an alternate manner.

In general, the means of formation of the rows 50 of the machines M, M' are preferably configured in such a way that, while one or more exit guides 51, 52, 53, 54 are filled with the objects T coming from the collecting and dropping means 30, the remaining one or more exit guides 51, 52, 53, 54, already containing the objects T stacked in an alternate manner, can be emptied so as to fill one or more packages H, H' placed in correspondence with the means of formation of the rows 50. At the end of this procedure, the means of formation of the rows 50 may be shifted so as to bring the empty exit guide(s) in correspondence with the collecting and dropping means 30 so that they are filled with the objects T stacked in an alternate manner, and to bring the other one or more exit guides containing the objects T in correspondence with the package(s) H, H' to be filled, and so on.

Figure 10:
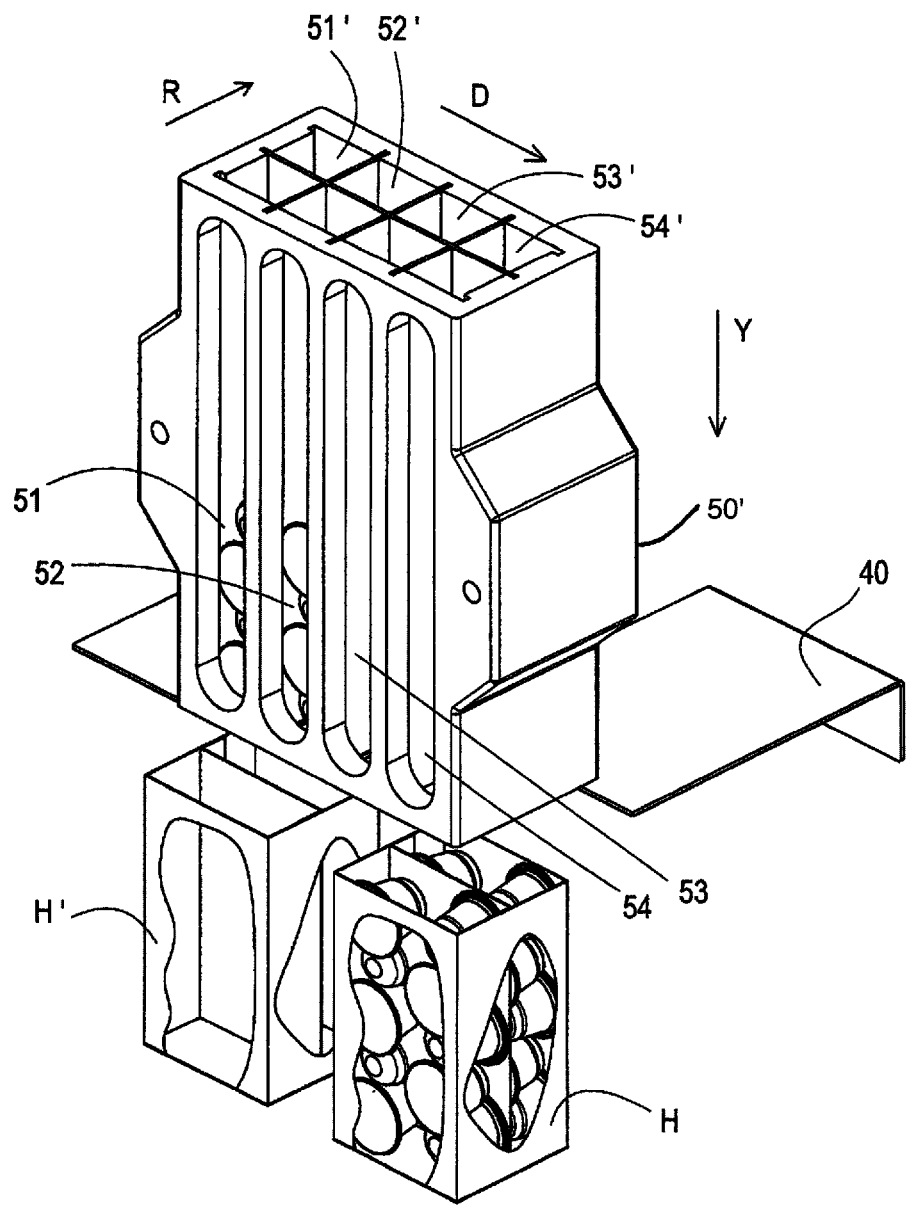
FIG. 10 schematically illustrates a three-dimensional view of the means of formation of the rows suitable for use in a machine for arranging objects, according to a further embodiment of the present invention.

FIG. 10 shows means of formation of the rows 50' suitable for use in machines M, M', according to a further embodiment of the present invention. Said means of formation of the rows 50' can be advantageously employed to fill packages H, H' suitable to contain several rows of objects T arranged in one or more rows and one or more columns. With particular reference to FIG. 10, the means of formation of the rows 50' comprise a first set of vertical guides 51, 52, 53, 54 and a second set of vertical guides 51', 52', 53', 54'. The means of formation of the rows 50' are preferably configured to initially fill one or more vertical guides of a first set, optionally translating along the direction D so as to fill adjacent vertical guides. Afterwards, the means of formation of the rows 50' are able to translate along a direction R perpendicular to the direction D, so as to align the collecting and dropping means of the machines M, M' with one or more vertical guides belonging to the second set and to then proceed to fill them. After the objects T have been stacked in an alternate manner in the means of formation of the rows 50', so as to fill a number of vertical guides of the first and second sets corresponding to the number of rows and columns of the packages to be filled, the means of formation of the rows 50' may be emptied so as to fill the packages H, H'. Preferably, while the means of formation of the rows 50' are used to fill a first package H placed in correspondence with the vertical guides containing the objects T stacked in an alternate manner, one or more new rows of objects T are stacked in one or more vertical guides of the means of formation of the rows 50', suitably aligned with the collecting and dropping means of the machines M, M'.

For example, as shown in FIG. 10, the means of formation of the rows 50' may be configured to initially align the collecting and dropping means of the machine M with the vertical guide 54' and to place, in the guide 54', a single file row of objects T in an alternate manner. Subsequently, the means of formation of the rows 50' may be shifted along the direction R, so that the guide 54 is aligned with the collecting and dropping means of the machine M and a new row of objects T is positioned in an alternate manner in the guide 54. The means of formation of the rows 50' may then be shifted along the direction D, so that the collecting and dropping means of the machine M are aligned with the guide 53 and the guide 53 is filled. Subsequently, the means of formation of the rows 50' may be further translated along the direction R, so as to align the collecting and dropping means of the machine M with the guide 53' and to fill the guide 53'. The vertical guides 53, 54, 53', 54' may then be used to fill as many rows and columns of the package H.

Preferably, before filling the package H, the means of formation of the rows 50' may be further shifted along the direction D so as to align the vertical guide 52' with the collecting and dropping means of the machine M, so that, while the package H is being filled, a new single file row of objects T is positioned in the vertical guide 52'. Subsequent translations of the means of formation of rows 50' along the directions D and R may be necessary to also fill the guides 52, 51 and 51'. Similarly, the vertical guides 51, 52, 51' and 52' may then be used to fill as many rows and columns of the package H', and so on.

It is obvious that the fact that the means of formation of the rows 50' are first shifted along the direction R, then along the direction D and then again along the direction R has been described as an illustrative way. In fact, the means of formation of the rows 50' could also be first shifted along the direction D, then along the direction R and then again along the direction D. In general, any combination of translations along the directions D and R, which allows to advantageously fill the vertical guides arranged in the different series, could be employed during the filling of the means of formation of the rows 50'.

It is clear that, even if the functioning of the means of formation of the rows 50' has been described in relation to the machine M which allows to fill only one exit guide at a time, the means of formation of the rows 50' could be advantageously employed also in relation to the machine M'. For example, with particular reference to FIG. 10, the means of formation of the rows 50' could initially be aligned with the collecting and dropping means of the machine M', so as to fill the guides 51', 52', 53' and 54' of the second set. Subsequently, the means of formation of the rows 50' could be shifted along the direction R so as to align the first set of guides with the collecting and dropping means of the machine M' and to fill the guides 51', 52', 53' and 54'.

It is obvious that the fact that the means of formation of the rows 50' are shifted along the direction R so as to align them with the collecting and dropping means of the machine M' is described as an illustrative way. For example, the means of formation of the rows 50' could also be initially aligned with the collecting and dropping means of the machine M' so as to fill the guides 54 and 54' and could then be shifted along the direction D so as to fill, in series, the guides 53, 53', then the guides 52, 52' and then the guides 51, 51'. Preferably, the means of formation of the rows 50' in combination with the machine M' are configured to initially align as many vertical guides as the sets of rotation means of the machine M' and so as to subsequently perform a translation along D or R so as to align a new set of vertical guides with the collecting and dropping means of the machine M'.

Finally, even if it is shown in FIG. 10 that the means of formation of the rows 50' comprise two sets of guides, each comprising four vertical guides, it is clear that they could comprise any number of sets of guides, for example one, three, four, five or more, and that each set could comprise any number of vertical guides, for example one, two, three, five, six or more.

Even if the present invention has been described with reference to the embodiments described above, it is clear to the skilled person that various modifications, variations and improvements of the present invention can be carried out in light of the teachings described above and within the scope of the enclosed claims, without departing from the subject matter and the scope of the invention.

For example, even if it is shown that the separating means 20 comprise two rotatable guides 21A and 21B placed on the same plane, it is clear that the separating means 20 may comprise any other movable element capable of receiving the objects T from a single file row and alternately transporting them towards the first and the second rotation means 31A and 31B, so as to divide them into two groups. For example, the separating means 20 may comprise a single guide capable of rotating about the axis X, alternately counterclockwise and clockwise, so as to reach the first and second rotation means, respectively. For example, the separating means 20 may comprise any type of housing capable of receiving the objects T and bringing them, following a rotation or even a translation, towards the first and second rotation means respectively. For example, they may even comprise a directing lever.

For example, even if it has been shown that the machine M comprises only a first barrier means 40, it is clear that the machine M may further comprise second barrier means 40' suitable for dividing the single file row F of objects T into groups G having a predefined number of objects T. The first barrier means 40 and the second barrier means 40' may comprise, for example, pneumatic cylinders capable of opening or closing as required.

Furthermore, according to alternative embodiments of the present invention, each exit guide of the means of formation of the rows 50 may not comprise barrier means 40 and may be in connection with a further guide, for example a guide oriented so as to connect the machine according to the present invention with a packaging machine suitable for inserting the single file rows of objects arranged in an alternate manner into the respective packages.

Finally, those areas which are supposed to be known to the skilled person have not been described, in order to avoid unnecessarily overshadowing the described invention.

LIST OF REFERENCES

A: first group of objects
B: second group of objects
C1: first arc of circumference
C2: second arc of circumference
C3: third arc of circumference
C4: fourth arc of circumference
D: translation direction
R: translation direction perpendicular to D
F: single file row of objects
H, H': packages of objects
M, M': machine
P: plane of the separating means
T: object
Te: first end of object T
Tb: protruding edge of the first end of the object T
Tf: second end of object T
Y: direction of fall
10: guiding means
20: separating means
21A, 21A': first guide
21B, 21B': second guide
22: rotatable element
23A, 23A': first opening
23B, 23B': second opening
30: collecting and dropping means
31A, 31A': first means of rotation
31B, 31B': second means of rotation
33: slit
40, barrier means
50, 50': means of forming rows
51, 52, 53, 54: exit guides

What is claimed is:

1. A machine for arranging objects that comprise a first end with a protruding edge and a second end, in an alternate manner along single file rows, said machine comprising:
   guiding means configured to guide said objects along at least one single file row, in such a way that said objects lay on one of said first end and said second end;
   separating means suitable for separating said object into a first group and a second group;
   collecting and dropping means suitable for receiving said objects of said first group and said objects of said second group and for dropping said objects along a common direction, said collecting and dropping means comprising first rotation means suitable for rotating said objects of said first group in a clockwise direction along a first arc of circumference while being dropped in the common direction so that, at the end of rotation, said objects no longer lay on either said first or second end, and second rotation means suitable for rotating said objects of said second group in a counterclockwise direction along a second arc of circumference while being dropped in the common direction, wherein at the end of rotation, said objects no longer lay on either said first or second end, said first arc of circumference and said second arc of circumference being defined on a plane parallel to the common direction, so as to stack said objects one above the other in an alternate manner along single file rows; and
   wherein, said separating means are suitable for receiving said objects from said at least one single file row and subsequently separating said objects into said first group and said second group and said separating means are configured to alternately transport said objects respectively towards said first rotation means and towards said second rotation means; and
   wherein said separating means rotates about an axis that passes through the end of rotation between the first rotation means and the second rotation means.

2. Machine according to claim 1, wherein:
   said separating means are configured to accommodate, one after the other, said objects coming from said at least one single file row when receiving them from said guiding means.

3. Machine according to claim 1, wherein:
   said separating means comprise at least one rotatable element, suitable for accommodating an object coming from said at least one single file row and for transporting an object alternately towards said first rotation means and towards said second rotation means, rotating alternately in a counterclockwise direction and in a clockwise direction wherein the axis is parallel to said common direction.

4. Machine according to claim 3, wherein:

said guiding means are configured to guide said objects in two or more single file rows, so that said objects lay on one of said first end and said second end;

said collecting and dropping means comprise two or more first rotation means and two or more second rotation means respectively; and said at least one rotatable element is suitable for simultaneously accommodating two or more said objects, each coming from a corresponding single file row, and for transporting said objects alternately to the corresponding two or more first rotation means and to the corresponding two or more second rotation means, by rotating alternately in a counterclockwise direction and in a clockwise direction with respect to the axis parallel to said common direction.

5. Machine according to claim 1, wherein:

said separating means comprise a first guide and a second guide placed on a planar structure defining a plane, and suitable for rotating about an axis perpendicular to said plane and suitable for accommodating said objects, wherein the objects accommodated in said first guide, laying on said end, are rotated in a counterclockwise direction along a third arc of circumference defined on said plane and delivered to said first rotation means, wherein the objects accommodated in said second guide, laying on said end, are rotated in a clockwise direction along a fourth arc of circumference defined on said plane and brought to said second rotation means.

6. Machine according to claim 5, wherein:

said first guide and said second guide form a predefined angle in the plane of the planar structure between said first guide and said second guide and said counterclockwise rotation of said objects along said third arc of circumference and said clockwise rotation of said objects along said fourth arc of circumference correspond to said predefined angle.

7. Machine according to claim 5, wherein:

said planar structure is configured to form a first opening placed in correspondence with said first rotation means and a second opening placed in correspondence with said second rotation means, so that said objects accommodated in said first guide are free to fall through said first opening until they reach said first rotation means, and said objects accommodated in said second guide are free to fall through said second opening to reach said second rotation means.

8. Machine according to claim 1, further comprising:

means for the formation of rows comprising one or more exit guides suitable for containing said objects, said objects being arranged in an alternate manner along single file rows and coming from said collecting and dropping means, and wherein said means for the formation of rows are configured to be translated along a translation direction perpendicular to said common direction, in both ways, by a step at least equal to a width of one of said one or more said single exit guides.

9. A method for arranging objects that comprise a first end with a protruding edge and a second end, in an alternate manner along single file rows, said method comprising the following steps:

a) guiding said objects along at least one row so that they lay on one of said first end and said second end;

b) separating said objects into a first group and a second group of objects by alternately transporting the first group of said objects respectively by rotation about an axis towards a first direction to a first drop opening and transporting the second group of said objects by rotation about the axis towards a second direction to a second drop opening;

c) dropping said objects belonging to said first group and said objects belonging to said second group, in an alternate manner, along a common direction;

d) first rotating, during said step of dropping, said objects belonging to said first group in a clockwise direction along a first arc of circumference in such a way that, at an end of said first rotating, said objects do not lay any longer on said end, and second rotating, during said step of dropping, said objects belonging to said second group in a counterclockwise direction along a second arc of circumference in such a way that, at an end of said second rotating, said objects no longer lay on said end, the axis passing through a location at the end of said step of first rotating and said step of second rotating, and said first arc of circumference and said second arc of circumference being defined on a plane parallel to said common direction, so as to stack said objects one on top of each other in an alternate manner along single file rows.

10. Method according to claim 9, wherein said steps b), c) and d) are carried out in such a way that, while a first object, which has been transported towards said first direction is dropped along said common direction and is rotated, a second object is transported towards said second direction.

11. Method according to claim 9, further comprising the following step:

e) accommodating said objects, by keeping them laying on said end, in separating means suitable for alternately moving towards said first direction and towards said second direction, wherein said step e) is carried out prior to said step b).

12. Method according to claim 11, wherein:

the movement of said separating means in said step e) consists in an alternate rotation in a counterclockwise direction and in a clockwise direction with respect to the axis.

13. Method according to claim 12, wherein:

said objects are alternately rotated about said axis in a counterclockwise direction and in a clockwise direction, describing respectively a third arc of circumference and a fourth arc of circumference placed on a plane.

14. Method according to claim 9, wherein said step c) further comprises the following step:

f) dropping said objects in free fall;

wherein said step f) occurs prior to said step d).

15. Method according to claim 9, wherein said step a) is carried out so as to guide said objects along two or more single file rows, so that they lay on said end and said step b) is carried out so as to alternately transport two or more said objects respectively towards a first direction so as to feed said first group and towards a second direction so as to feed said second group.

16. Method according to claim 9, further comprising the following step:

g) stacking said objects, one on top of each other in an alternate manner along single file rows, within means of formation of rows comprising one or more exit guides, wherein said step g) is carried out at the end of said step d), and in such a way that, while one or more exit guides are filled with said objects coming from said dropping and collecting means, one or more exit guides containing said objects, stacked one on top of each other in an alternate manner along single file rows, are employed to fill one or more packages.

17. Method for stacking a predetermined number of objects in an alternate manner along single file rows in a package, said method comprising the arrangement of said objects in an alternate manner along single file rows according to claim 9 further comprising the step of:

placing the single file rows of the objects in the package.

18. A machine for arranging objects having an orientation in an alternate manner along single file rows comprising:

a guide configured to transport objects having a common orientation;

a separator positioned to receive the objects from said guide, said separator configured to rotate alternately in a first direction and a second direction, wherein said separator comprises a rotatable element having a first guide slot and a second guide slot formed therein, the first guide slot and the second guide slot extending radially from an axis of the rotatable element and separated by a predefined angle wherein each of the first and second guide slots are configured to hold and transport alternately one of the objects, wherein the first guide slot and the second guide slot alternately transport the one of the objects of a first group to the first location in the first direction and another one of the objects of a second group to the second location in the second direction, whereby the objects are alternately transported to a first location in the first direction and to a second location in the second direction;

a first arc surface having a first entrance end and a first exit end, the first entrance end placed adjacent the first location receiving the objects from said separator, whereby the orientation of the objects are rotated from the first entrance end to the first exit end of said first arc surface;

a second arc surface having a second entrance end and a second exit end, the second entrance end placed adjacent the second location receiving said objects from said separator, whereby the orientation of the objects are rotated from the second entrance end to the second exit end of said second arc surface;

wherein the first exit end of the first arc surface and the second exit end of the second arc surface are located at a common location; and an exit guide positioned at the common location receiving the objects from said first arc surface and said second arc surface, whereby the objects are arranged with the orientation alternating in the single file rows.

19. Machine according to claim 18, wherein:

the predefined angle is ninety-degrees.

20. A machine for arranging objects having an orientation in an alternate manner along single file rows comprising:

a guide configured to transport objects having a common orientation;

a rotatable element placed adjacent said guide and a support plane surface, said rotatable element having a first slot adapted to receive and transport a first one of the objects and a second slot adapted to receive and transport a second one of the objects, the first slot and the second slot separated by a circular sector having an axis of rotation wherein the first slot has a first open end formed in a periphery of the circular sector and the second slot has a second open end formed in the periphery of the circular sector with the first open end and the second open end separated by a predefined angle on the circular sector, said rotatable element configured to alternately rotate clockwise and counter-clockwise alternately positioning the first open end and the second open end adjacent said guide, whereby the first one of the objects is received and transported in the first slot and the second one of the objects is received and transported in the second slot;

a first rotation element having a first arc surface between a first rotation element entrance end and a first rotation element exit end wherein the first rotation element entrance end is placed adjacent the support plane surface;

a second rotation element having a second arc surface between a second rotation element entrance end and a second rotation element exit end wherein the second rotation element entrance end is placed adjacent the support plane surface and second rotation element exit end is placed adjacent the first rotation element exit end; and an exit guide positioned at the first rotation element exit end and the second rotation element exit end to receive the objects, whereby the objects are arranged with the orientation alternating in the single file rows.

21. Machine according to claim 20, wherein:

the predetermined angle is ninety-degrees.

22. Machine according to claim 20, wherein:

wherein the axis of rotation of the circular sector passes through the first rotation element exit end and the second rotation element exit end.

* * * * *